Nov. 24, 1970 M. HAUERBACH 3,541,681

METHOD OF CONSTRUCTING A WIRED CORE MEMORY SYSTEM

Filed July 16, 1968

INVENTOR
MARKVARD HAUERBACH

Anderson, Luedeka, Fitch, Even, & Tabin
ATTYS.

United States Patent Office 3,541,681
Patented Nov. 24, 1970

3,541,681
METHOD OF CONSTRUCTING A WIRED CORE MEMORY SYSTEM

Markvard Hauerbach, San Diego, Calif., assignor to Stromberg Datagraphics Inc., San Diego, Calif., a corporation of Delaware Filed July 16, 1968, Ser. No. 745,159
Int. Cl. H01f 7/06
U.S. Cl. 29—604 5 Claims

ABSTRACT OF THE DISCLOSURE

A method is described for constructing a wired core memory system by utilizing a fixture including upright members, around selected ones of which the wires of the system are wound. The wires wound on the upright members are sandwiched between two layers of material, after which the sandwich is removed and legs of magnetic cores are inserted through the layers at the regions around which the wires are positioned. Also described is a wired core memory system which may be constructed as described.

This invention relates to wired core memory systems and, more particularly, to an improved method for constructing a wired core memory system and to a wired core memory system which may be constructed in accordance with such method.

Various types of electrical apparatus incorporate memory systems which comprise a plurality of magnetic cores and one or more wires wound thereon. Pulses may be produced in the wires upon energization of the magnetic cores by appropriate means, or the wires may be utilized to energize the magnetic cores in accordance with the manner in which they are wound thereon. By winding the wires on selected magnetic cores, or by energizing one or more of the cores in a predetermined pattern, or both, pulse outputs representative of stored information may be produced.

One particular application in which a wired core memory system is useful, and which will be described briefly herein by way of a specific example, is a character generator system which produces deflection voltages for the electron beam of a cathode ray tube in order to cause the beam to write characters on the screen of the tube. A wired core memory system may be utilized in a character generator such that the logic storage for each character or symbol is in the form of a set of wires, wound on selected magnetic cores in a series. The cores may be sequentially energized by a sequence of suitable signals appropriately coupled thereto. Upon energization of each magnetic core, a pulse is produced or not produced in the wires, depending on whether the wires are wound upon that core or not. Thus, a series of pulses may be produced in each wire at desired intervals to supply information, such as in binary code form, to electronic circuitry which translates the information into appropriate deflection voltages.

Naturally, a wired core memory system utilizing a plurality of magnetic cores with wires wound thereon may be constructed by winding or not winding, as the case may be, each wire around a leg of the desired core. Where it is necessary to do this by pushing the wire through the core and bringing it back around, the manual dexterity required may contribute to possible error or production slowdown, which can have a considerable cost implication in large scale production operations. Moreover, where a number of loose wires are wound or not wound on a series of magnetic cores, confusion and sloppy appearance may result. To avoid this, the wires may be bundled together in a harness, where possible, but this may add additional complexity to the manufacturing operation, with a consequent increase in expense.

Accordingly, it is an object of this invention to provide an improved method for constructing a wired core memory system.

Another object of the invention is to provide a method for constructing a wired core memory system which is fast and economical.

A further object of the invention is to provide a method for constructing a wired core memory system which quickly provides a rugged and dependable wiring arrangement.

It is another object of the invention to provide an improved wired core memory system.

Another object of the invention is to provide a wired core memory system having a rugged and dependable wiring harness therein which may be produced with minimal additional operations.

Other objects of the invention will become apparent to those skilled in the art from the following description taken in connection with the accompany drawings wherein.

Figures 1, 2, 3, 4, 5:
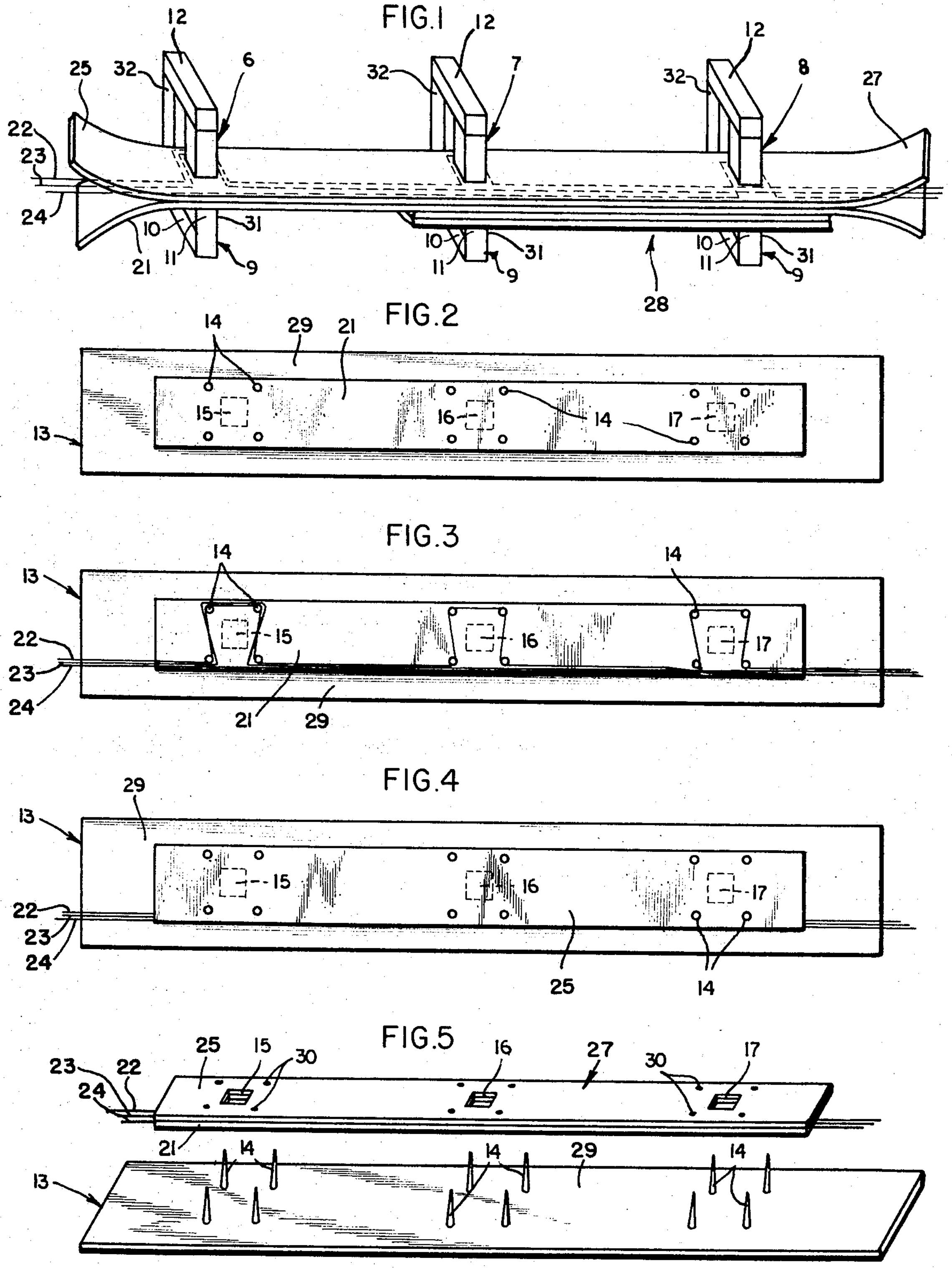
FIG. 1 is a diagrammatic perspective view of a portion of a wired core memory system constructed in accordance with the invention.
FIG. 2 is a top plan view illustrating a step in the method of the invention.
FIG. 3 is a diagrammatic top plan view illustrating a further step in the method of the invention.
FIG. 4 is a diagrammatic top plan view illustrating a still further step in the method of the invention.
FIG. 5 is an exploded diagrammatic perspective view illustrating still another step in the method of the invention.

Very generally, the method of the invention utilizes magnetic cores 6, 7 and 8 each in the form of a U shaped portion 9 with a base 10 and two legs 11, and a separable low reluctance member 12. The method also utilizes a fixture 13 including upright members 14 positioned surrounding regions 15, 16, 17. Each of the regions 15, 16 and 17 is of a size greater than the cross sectional area of one of the legs 11 of the magnetic cores 6, 7 and 8. A first layer 21 of low conductance material is placed perpendicular to the upright members and adjacent thereto. A plurality of wires 22, 23 and 24 are wound on selected upright members in accordance with the pattern in which such wires are to be wound on the cores. A second layer 25 of low conductance matterial is placed over the first layer and is secured thereto to capture the wires between the two layers. The wire-layer sandwich thus formed is removed from adjacent the upright members, apertures are made at the regions 15, 16, 17, and a leg 11 of one of the U-shaped core portions is inserted through the layers at each of the regions. The open ends of each of the U-shaped core portions 9 are then closed with a low reluctance member 12 to complete the cores.

Referring now more particularly to FIG. 1, a portion of a wired core memory system constructed in accordance with the invention is illustrated. The system includes a plurality of magnetic cores 6, 7 and 8. Each core is comprised of a U-shaped portion 9 and a low reluctance member 12 closing the open end of the U-shaped portions. The low reluctance members 12 are secured to the U-shaped core portions 9 by suitable means, not illustrated, and thereby complete a closed low reluctance path.

In the embodiment illustated in FIG. 1, two wiring harness assemblies 27 and 28 are shown positioned overlying one another and having two magnetic cores in common, but it is to be understood that the number of harness assemblies, the number of wires in each assembly, and the number of cores, may vary depending upon the requirements of the system. Since the harness assembly 28 is manufactured in the same manner as the harness assembly 27, and since the harness assembly 27 is more readily visible in the drawings, only the harness assembly 27 will be described in detail. For clarity in the drawings the thicknesses of the two layers 21 and 25 of each harness assembly are exaggerated. Also for clarity the wires 22, 23 and 24 are shown spaced laterally from one another except where they cross one another, although in practice the wires might well be bunched and overlie one another. The three wires 22, 23 and 24 of the harness assembly 27 are wound on selected legs of the U-shaped portions 9 of the cores 6, 7 and 8. For purposes of illustration, the wire 22 is shown wound on the legs of the cores 6 and 7. The wire 23 is shown wound only on a leg of the core 6, and the wire 24 is shown wound only on a leg of the core 8. Nevertheless, other combinations are possible depending upon the desired information to be stored in the memory system. A suitable wiring arrangement, not shown, may be provided for the wiring harness assembly 28 in a generally similar manner. The wires in the harness assemblies may be used either to produce pulses upon energization of the core or cores upon which they are wound (such energization being accomplished by suitable means not illustrated, such as primary coils), or to energize the cores upon which they are wound when a current pulse is passed through the wire. The invention is applicable to either situation.

In one application of the invention, the wires may be seletively wound in either of two senses about selected regions. For example, a wire may be wound so it effectively encircles the region 15 in a clockwise sense, the region 16 in a counterclockwise sense, and the region 17 in a clockwise sense. If the cores therein are then energized sequentially, all three in the same sense, the wire so wound may be connected to produce first a positive going pulse, then a negative going pulse, and finally another positive going pulse. Pulse codes produced by such wires are three level codes, rather than binary codes, and are useful in character generators, as well as other applications. The reversal of sense can be produced by winding in the reverse direction on corresponding core legs 31, or by winding in the same sense on alternate core legs 32.

The wires 22, 23 and 24 are sandwiched between the two layers 21 and 25 of material. The wires are electrically insulated from one another and the material of the layers 21 and 25 is electrically insulative. Both the wire insulation and the layer material are nonmagnetic so that interaction of the core and wires is not prevented by the insulation functioning as a magnetic shield. Preferably, the material for the layers 21 and 25 is a flexible material having a layer of adhesive thereon, such as various types of commercially available pressure sensitive tape. As will be explained, the legs 11 of the cores 6, 7 and 8 pass through openings in the layers 21 and 25 at the regions about which the wires may be wound.

Referring now to FIG. 2, the method of the invention is practiced in connection with a fixture 13 including a base plate 29 and a plurality of upright members 14 in the form of spikes. Groups of the upright members 14 are positioned to surround predetermined regions 15, 16 and 17, each of a size greater than the cross sectional area of the leg 11 of one of the cores 6, 7 and 8 which is passed therethrough. The layer 21 is placed against the upper surface of the base plate 29 and over the spikes 14 which puncture the layer 21 forming holes 30. Thus, the layer 21 extends perpendicular to the spikes adjacent thereto. As previously mentioned, it is preferred that the layer 21 be a pressure sensitive tape. It is also preferred that the layer be placed on the base plate 29 with the adhesive side facing away therefrom.

Referring now to FIG. 3, the wires 22, 23 and 24 are wound around the regions 15, 16 and 17 where desired by winding them appropriately on selected spikes 14. The wires are pressed down flat against the upper surface of the pressure sensitive tape or layer 21, adhering thereto and thus being maintained in position. By comparing FIG. 3 with FIG. 1, it may be seen that the wires follow the same position pattern in both figures.

Referring now to FIG. 4, the second layer 25 is punctured by the spikes 14 and placed over the first layer. The second layer 25 is also, as before mentioned, preferably a pressure sensitive tape and is placed with the adhesive side down so that the mating or facing surfaces of the two layers are the adhesive surfaces. This secures the first and second layers together to capture the wires 22, 23 and 24 therebetween.

The sandwich wiring harness assembly 27 formed by the two layers 21 and 25 and the wires 22, 23 and 24 is then removed from the fixture by lifting it off the spikes as shown in FIG. 5. Both layers are then perforated or punched out, by suitable means, at the regions 15, 16 and 17 to provide openings through which the legs 11 of the U-shaped portions 9 of the cores 6, 7 and 8 may be passed. After the legs of the U-shaped portions of the cores are passed through the appropriate openings at the predetermined regions 15, 16 and 17, and after all wiring harnesses to be used have been similarly placed, the low reluctance members 12 are placed over the open ends of the U-shaped portions of the cores to complete the cores. The assembly thus appears as in FIG. 1.

By utilizing the fixture and method as above described, the wires may be readily placed in the proper position without having to thread the wires through any cores. Moreover, the wires are held firmly in place throughout the operation in a manner which is simple and economical. The resultant harness formed by the wires and the two layers 21 and 25 securely holds and positions the wires in a rugged and dependable arrangement. Fixtures may be constructed of various configurations depending upon need. For example, if the cores are to be disposed in a ring, the fixture may be of annular shape.

When discrete wiring assemblies are used to determine the respective character shapes of a character generator, a large number of wiring assemblies are required for each generator. A typical character generator having a repertory of 64 characters is wired with 64 wiring sandwiches. Wiring sandwiches made according to this invention are advantageous because of their relatively thin flat shape. Sixty-four such sandwiches may be stacked on U-shaped magnetic cores less than one inch high. If it is desired to change the shape of only one character in the repertory, the wiring sandwich for that character is removed and replaced with a new wiring sandwich. Magnetic core character generators wired with a multiplicity of loose wires cannot be so easily altered.

Various modifications of the invention in addition to those shown and described herein will become apparent to those skilled in the art from the foregoing description and accompanying drawings. Such modifications are intended to fall within the scope of the appended claims.

What is claimed is:

1. A method for constructing a wired core memory system by utilizing a fixture including upright members positioned to surround predetermined regions each region being of a size greater than the cross sectional area of one of the legs of the cores, said method comprising: placing a first layer of low conductance material perpendicular to said upright members and adjacent thereto, winding a plurality of wires on selected upright members in accordance with the pattern in which such wires are to be placed on the cores, placing a second layer of low conductance material over said first layer and securing said first and second layers together to capture the wires between the two layers, removing the wire-layer sandwich thus formed from adjacent the upright members, inserting legs of U-shaped core portions through the layers at suitable apertures provided in the predetermined regions, and closing the open ends of the U-shaped core portions with low reluctance members to complete the cores.

2. A method according to claim 1 wherein the upright members comprise a plurality of spikes, and wherein both layers of material are punctured by the spikes when placed.

3. A method according to claim 2 wherein the spikes extend perpendicular to a base plate and wherein the first layer of material is placed flush against the base plate and is punctured by the spikes prior to winding the wires.

4. A method according to claim 1 wherein both layers of material are provided with a pressure sensitive adhesive on their facing surfaces.

5. A method according to claim 1, wherein said apertures are provided by perforating both layers at the prepredetermined regions prior to inserting the core legs therethrough.

References Cited

UNITED STATES PATENTS

| | | | |
|---|---|---|---|
| 3,409,971 | 11/1968 | Morrow | 29—203 |
| 3,432,830 | 3/1969 | Owen et al. | 340—174 |
| 3,451,129 | 6/1969 | Alonso et al. | 29—604 |

JOHN F. CAMPBELL, Primary Examiner

CARL E. HALL, Assistant Examiner

U.S. Cl. X.R.

29—203, 605; 336—205, 232; 340—174

UNITED STATES PATENT OFFICE

CERTIFICATE OF CORRECTION

Patent No. 3,541,681 Dated Nov. 24, 1970

Inventor(s) Markvard Hauerbach

It is certified that error appears in the above-identified patent and that said Letters Patent are hereby corrected as shown below:

Column 1, line 5 - for "Stromberg Datagraphics, Inc."
read "Stromberg DatagraphiX, Inc.".

Signed and sealed this 23rd day of March 1971.

(SEAL)
Attest:

EDWARD M.FLETCHER,JR.
Attesting Officer

WILLIAM E. SCHUYLER, JR.
Commissioner of Patents